US012651573B2

(12) United States Patent
Sun et al.

(10) Patent No.: US 12,651,573 B2
(45) Date of Patent: Jun. 9, 2026

(54) PIXEL CIRCUIT AND DRIVING METHOD THEREOF

(71) Applicant: SEMICONDUCTOR INTEGRATED DISPLAY TECHNOLOGY CO., LTD., Wuhu City (CN)

(72) Inventors: Lin Sun, Wuhu City (CN); Shengfang Liu, Wuhu City (CN)

(73) Assignee: SEMICONDUCTOR INTEGRATED DISPLAY TECHNOLOGY CO., LTD., Wuhu City (CN)

( * ) Notice: Subject to any disclaimer, the term of this patent is extended or adjusted under 35 U.S.C. 154(b) by 0 days.

(21) Appl. No.: 19/095,720

(22) Filed: Mar. 31, 2025

(65) Prior Publication Data

US 2025/0384833 A1 Dec. 18, 2025

(30) Foreign Application Priority Data

Jun. 14, 2024 (CN) ......................... 202410771520.6

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01)

(58) Field of Classification Search
CPC ..................... G09G 3/3233; G09G 2300/0819
USPC .......................................................... 345/214
See application file for complete search history.

(56) References Cited

U.S. PATENT DOCUMENTS

| | | | | |
|---|---|---|---|---|
| 11,735,098 B2 | 8/2023 | Takasugi | | |
| 2012/0019498 A1* | 1/2012 | Jeong | G09G 3/3233 345/76 | |
| 2023/0042966 A1* | 2/2023 | Huangfu | G09G 3/3258 | |
| 2024/0087518 A1* | 3/2024 | He | G09G 3/3266 | |

FOREIGN PATENT DOCUMENTS

| | | | |
|---|---|---|---|
| CN | 104809989 | A | 7/2015 |
| CN | 107919093 | A | 4/2018 |
| CN | 113628585 | A | 11/2021 |
| JP | 2021096282 | A | 6/2021 |
| WO | 2024057712 | A1 | 3/2024 |

OTHER PUBLICATIONS

Notice of Reasons for Rejection of Japanese Patent Application No. 2025-092529, dated Dec. 9, 2025 (7 pages).

* cited by examiner

*Primary Examiner* — Calvin C Ma
(74) *Attorney, Agent, or Firm* — Meunier Carlin & Curfman LLC

(57) ABSTRACT

Disclosed are a pixel circuit and a driving method thereof. The pixel circuit includes: a data writing unit configured to control an input of a data signal; a first energy storage unit configured to store the data signal output by the data writing unit; a second energy storage unit configured to store the data signal together with the first energy storage unit; a light-emitting unit configured to emit light for display; a driving unit, where an input end of the driving unit is connected with the high level VDD, a control end of the driving unit is input with a control signal, and an output end of the driving unit is configured to provide a light-emitting current to the light-emitting unit; a light-emitting control transistor configured to control conduction of the driving unit and the light-emitting unit; and a compensation unit.

20 Claims, 5 Drawing Sheets

PIXEL CIRCUIT AND DRIVING METHOD THEREOF

CROSS-REFERENCE OF RELATED APPLICATIONS

The present disclosure claims the priority of Chinese Patent Application No. 202410771520.6, filed with the China National Intellectual Property Administration on Jun. 14, 2024 and entitled "Pixel Circuit and Driving Method thereof", the entire contents of which are incorporated herein by reference.

TECHNICAL FIELD

The present disclosure relates to the technical field of display technology, and in particular to a pixel circuit and a driving method thereof.

BACKGROUND

Organic Light-emitting Diode (OLED) is one of the hot topics in the current research field of flat panel displays. Compared with liquid crystal displays, OLEDs have the advantages of low energy consumption, low production cost, self-luminescence, wide viewing angle and fast response speed. Currently, OLEDs have begun to replace traditional liquid crystal displays (LCD) in flat panel display fields such as mobile phones, PDAs, and digital cameras. Among them, the design of the driving circuit is the key technology to realize the display function.

The driving circuit can generally include a scanning driving circuit, a light-emitting control circuit, a data driving circuit, a pixel circuit, etc. Among them, the pixel circuit design is the core technical content of the OLED display and has important research significance.

With the development of display technology, people's requirements for display effects are getting higher and higher. However, due to the differences in physical structure and electrical characteristics of semiconductor devices between different pixels, in semiconductor devices, especially MOSFET (Metal-Oxide-Semiconductor Field-Effect Transistor), the substrate bias voltage has a significant impact on device performance. How to optimize the substrate bias effect is an urgent problem to be solved in order to improve display uniformity.

SUMMARY

In order to solve the problems existing in the related art, the present disclosure provides a pixel circuit and a driving method thereof.

The present disclosure provides a pixel circuit, including:

- a data writing unit, configured to control an input of a data signal into the pixel circuit;
- a first energy storage unit, configured to store the data signal output by the data writing unit, where a first end of the first energy storage unit is connected with an output end of the data writing unit;
- a second energy storage unit, configured to store the data signal together with the first energy storage unit, where a first end of the second energy storage unit is connected with a high level VDD, and a second end of the second energy storage unit is connected with a second end of the first energy storage unit;
- a light-emitting unit, configured to emit light for display;

- a driving unit, where an input end of the driving unit is connected with the high level VDD, a control end of the driving unit is input with a control signal, and an output end of the driving unit is configured to provide a light-emitting current to the light-emitting unit;
- a light-emitting control transistor, configured to control conduction of the driving unit and the light-emitting unit, where an input end of the light-emitting control transistor is connected with the output end of the driving unit, a control end of the light-emitting control transistor is connected with the first end of the first energy storage unit, and an output end of the light-emitting control transistor is connected with the light-emitting unit; and
- a compensation unit, where an output end of the compensation unit is connected with the first end of the first energy storage unit, an input end of the compensation unit is connected with the output end of the light-emitting control transistor, and a control end of the compensation unit is input with a compensation control signal.

In some embodiments, the pixel circuit further includes: a reset unit configured to reset the light-emitting unit; where the reset unit is connected with an input end of the light-emitting unit.

In some embodiments, the data writing unit includes: a first Positive channel Metal Oxide Semiconductor (PMOS) transistor;

- where a source electrode of the PMOS transistor is input with the data signal.

In some embodiments, the first energy storage unit includes: a first capacitor;

- where a first end of the first capacitor is connected with the output end of the data writing unit.

In some embodiments, the second energy storage unit includes: a second capacitor;

- where a first end of the second capacitor is connected with the high level VDD, and a second end of the second capacitor is connected with a second end of the first capacitor.

In some embodiments, the driving unit includes: a second PMOS transistor;

- where a source electrode of the second PMOS transistor is connected with the high level VDD, and a gate electrode of the second PMOS transistor is connected with the second end of the first capacitor and the second end of the second capacitor.

In some embodiments, the compensation unit includes: a fourth PMOS transistor;

- where a drain electrode of the fourth PMOS transistor is connected with the first end of the first capacitor, and a gate electrode of the fourth PMOS transistor is input with the compensation control signal.

In some embodiments, the light-emitting control transistor is a PMOS transistor;

- where a source electrode of the light-emitting control transistor is connected with a drain electrode of the second PMOS transistor, and a gate electrode of the light-emitting control transistor is connected with the first end of the first capacitor.

In some embodiments, an input end of the light-emitting unit is connected with a source electrode of the fourth PMOS transistor and a drain electrode of the light-emitting control transistor.

In some embodiments, the reset unit includes: a third PMOS transistor;

where a source electrode of the third PMOS transistor is connected with the output end of the compensation unit, a gate electrode of the third PMOS transistor is input with the reset signal, and a drain electrode of the third PMOS transistor is grounded.

In some embodiments, the pixel circuit further includes: a G point initialization unit configured to adjust a voltage of a G point;

where the G point initialization unit is connected with the first end of the first energy storage unit.

In some embodiments, the G point initialization unit includes: a sixth PMOS transistor;

where a gate electrode of the sixth PMOS transistor is input with an initialization control signal, a source electrode of the sixth PMOS transistor is input with an initialization signal, and a drain electrode of the sixth PMOS transistor is connected with the first end of the first energy storage unit.

The present disclosure provides a method for driving the pixel circuit, including in sequence: an initialization stage; a self-discharge stage; a writing stage; and a light-emitting stage; where at the self-discharge stage, a working time of the compensation unit is adjusted to complete an adjustment of a threshold voltage of the light-emitting control transistor.

In some embodiments, the method for driving the pixel circuit includes:

starting the initialization stage: turning on the driving unit and the data writing unit;

ending the initialization stage: turning off the data writing unit and the driving unit;

starting the self-discharge stage: turning on the compensation unit, turning off the compensation unit and turning on a reset unit after t1 time period, and turning off the reset unit after t2 time period, where the self-discharge stage lasts for t time period, and t=t1+t2;

at the writing stage, turning on the data writing unit;

at the light-emitting stage, turning off the data writing unit, and turning on the driving unit.

In some embodiments, when a=b, then t1=0, t2=t; when $a=b/(1-b)^2$, then t1=t, t2=0; where b=C2/(C1+C2), a is an substrate bias coefficient, C1 is a first capacitance value, and C2 is a second capacitance value.

In some embodiments, at the initialization stage, the first PMOS transistor, the second PMOS transistor, and the light-emitting control transistor are all turned on, the data signal is Vofs, and the G point is initialized.

In some embodiments, when a is between b and $b/(1-b)^2$, then $t1=t*f[b, b/(1-b)^2]$, and the function f is adjusted according to an operation of a panel.

In some embodiments, the function f is a linear function, a quadratic function or an exponential function.

In some embodiments, during the t1 time period: the fourth PMOS transistor is turned on, a source voltage of the light-emitting control transistor is reduced, a gate voltage of the light-emitting control transistor is increased; due to a substrate bias effect, the threshold voltage of the light-emitting control transistor is increased until a difference between the source voltage and gate voltage is equal to the threshold voltage of the light-emitting control transistor, and the light-emitting control transistor is turned off.

In some embodiments, during the t1 time period:

$$|V_{TH\_EF}| = a*(VDD - Vs) + |V_{TH}| = Vs - Vg;$$

$$(VDD - VS)*C2 + [(VDD - Vofs) - (Vs - Vg)]*C1 = (Vg - Vofs)*C1*C2/(C1 + C2);$$

where, $V_{TH\_EF}$ is an equivalent threshold voltage of the light-emitting control transistor, $V_{TH}$ is a threshold voltage of the light-emitting control transistor, and Vofs is an initialization voltage;

$$Vs1 = \{[a - (1 + x)^2]VDD + Vofs + |V_{TH}|\} / [1 + a - (1 + x)^2];$$

$$Vg1 = \{(1 + a)Vofs - (VDD - |V_{TH}|)(1 + x)^2\} / [1 + a - (1 + x)^2];$$

where a is an substrate bias coefficient, x=C2/C1, Vs1 is a source voltage of the light-emitting control transistor, Vg1 is a gate voltage of the light-emitting control transistor.

In some embodiments, during the t1 time period, a threshold voltage compensation of the light-emitting control transistor is calculated as follows:

$$(VDD - Vs1)*C2 + [(VDD - Vofs) - (Vs1 - Vg1)]*C1 = (Vg1 - Vofs)*C1*C2/(C1 + C2) = Q;$$

where during the t1 time period, ΔVs1 is a change amount of the source voltage of the light-emitting control transistor, and ΔVg1 is a change amount of the gate voltage of the light-emitting control transistor:

$$\Delta Vg1 = Vg1 - Vofs = Q*(C1 + C2)/(C1*C2);$$

$$\Delta Vs1 = Vs1 - VDD = Q*C1/C2*(C1 + C2);$$

$$\Delta Vs1/\Delta Vg1 = (1 - b)^2;$$

where a current through the light-emitting control transistor is calculated as follows:

$$I = \beta*(Vs1 - Vg1 - |V_{TH\_EF}|^2);$$

where, β is a constant.

In some embodiments, the t1 time period: VDD ranges from 3V to 6V, and Vofs ranges from 1V to 3V.

The present disclosure provides a pixel circuit and a driving method suitable for Micro OLED. The pixel circuit can compensate for the difference in transistor threshold voltage characteristics between different pixels, thereby improving the display quality of the panel.

BRIEF DESCRIPTION OF FIGURES

In order to more clearly illustrate the technical solutions in embodiments of the present disclosure, the drawings required for use in the description of embodiments will be briefly introduced below. Obviously, the drawings described below are only some embodiments of the present disclosure. For those skilled in the art, other drawings can be obtained based on these drawings without creative work.

DETAILED DESCRIPTION

Figure 1:
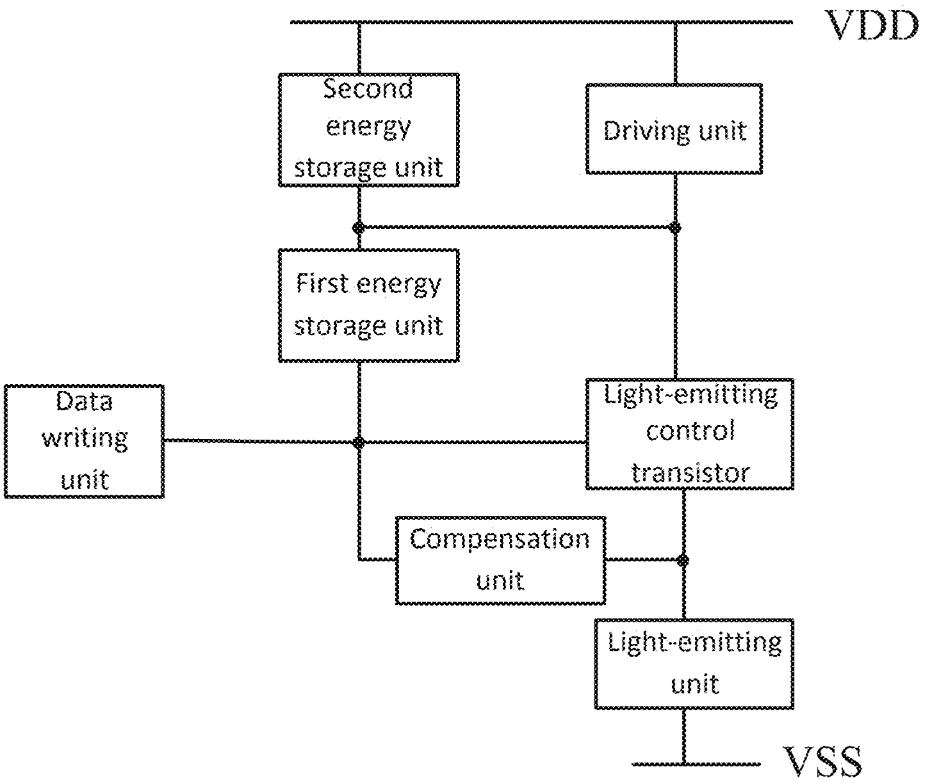
FIG. 1 is a schematic diagram of the structure of a pixel circuit according to an embodiment of the present disclosure.

Preferred embodiments of the present disclosure will be described in more detail below. Although the preferred embodiments of the present disclosure are described below, it should be understood that the disclosure can be implemented in various forms and should not be limited to the embodiments set forth herein.

In the present disclosure, unless otherwise specified, directional words such as "upper" and "lower" generally refer to the upper and lower parts of the device in normal use, and "inside" and "outside" refer to the outline of the device. Furthermore, the terms "first, second, third" are used for descriptive purposes only and should not be understood as indicating or implying relative importance or implicitly indicating the quantity of the indicated technical features. Therefore, features defined as "first, second, third" may explicitly or implicitly include one or more of these features. In the description of the present disclosure, "plurality" means two or more than two, unless otherwise clearly and specifically defined. The present disclosure provides an electrical device, so connection and interconnection both refer to conductive interconnection. Since the accompanying drawings are descriptions of the same device, the same reference numerals in the drawings represent the same components.

In some embodiments, the pixel circuit is formed by using a semiconductor substrate such as a silicon-based substrate, and a certain bias voltage is usually applied to the substrate. This voltage affects the threshold voltage, leakage current and other electrical characteristics of the semiconductor device. Changes in the substrate bias voltage will change the threshold voltage of the device. For example, in a MOSFET, increasing the substrate bias voltage increases the threshold voltage. This is because the bias voltage changes the voltage difference between the substrate and the source/drain electrode, which affects the capacitance between the source electrode and the substrate.

The substrate bias coefficient, also known as the substrate bias effect coefficient, refers to the degree of change in pixel performance parameters (such as voltage, sensitivity, noise, etc.) caused by changes in substrate bias voltage. This coefficient can be obtained through experimental measurement and modeling. Specifically, the substrate bias effect coefficient of a pixel is a key parameter that quantitatively describes the impact of changes in substrate bias voltage on pixel performance. For example, with respect to sensitivity, changes in substrate bias voltage may alter the voltage characteristics of the photodiode, affecting the response and sensitivity of pixels to light. For noise, the substrate bias voltage affects the leakage current and noise characteristics of the device. Different substrate biases may increase or decrease the dark current noise of a pixel. For dynamic range, by adjusting the substrate bias voltage, the dynamic range of the pixel can be optimized so that it performs well under different lighting conditions. When designing and optimizing image sensors, understanding and controlling this factor can help improve sensor performance, such as increasing sensitivity, reducing noise, and expanding dynamic range. These optimizations are particularly important in high-performance imaging applications (such as scientific imaging, medical imaging, and high-end photography).

The specific embodiments of the present disclosure are further described in detail below with reference to the accompanying drawings. FIG. 1 is a schematic diagram of the structure of a pixel circuit according to an embodiment of the present disclosure. As shown in FIG. 1, the pixel circuit of the present disclosure includes: a data writing unit, configured to control an input of a data signal into the pixel circuit; a first energy storage unit, configured to store the data signal output by the data writing unit, where a first end of the first energy storage unit is connected with an output end of the data writing unit; a second energy storage unit, configured to store the data signal together with the first energy storage unit, where a first end of the second energy storage unit is connected with a high level VDD, and a second end of the second energy storage unit is connected with a second end of the first energy storage unit; a light-emitting unit, configured to emit light for display; a driving unit, where an input end of the driving unit is connected with the high level VDD, a control end of the driving unit is input with a control signal, and an output end of the driving unit is configured to provide a light-emitting current to the light-emitting unit; a light-emitting control transistor, configured to control conduction of the driving unit and the light-emitting unit, where an input end of the light-emitting control transistor is connected with the output end of the driving unit, a control end of the light-emitting control transistor is connected with the first end of the first energy storage unit, and an output end of the light-emitting control transistor is connected with the light-emitting unit; and a compensation unit, where an output end of the compensation unit is connected with the first end of the first energy storage unit, an input end of the compensation unit is connected with the output end of the light-emitting control transistor, and a control end of the compensation unit is input with a compensation control signal.

In some embodiments, the pixel circuit further includes a reset unit configured to reset the light-emitting unit; where the reset unit is connected with an input end of the light-emitting unit.

Figure 2:
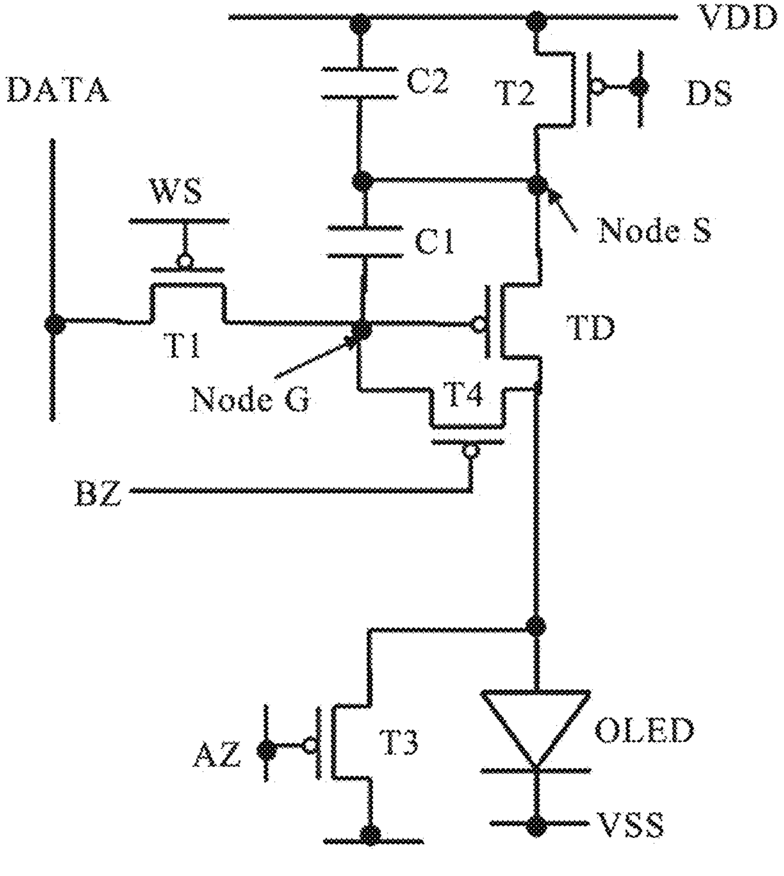
FIG. 2 is a circuit diagram of a pixel circuit according to an embodiment of the present disclosure.

FIG. 2 is a circuit diagram of a pixel circuit according to an embodiment of the present disclosure. As shown in FIG. 2, in some embodiments, the data writing unit includes: a first PMOS transistor T1; where a source electrode of the PMOS transistor is input with the data signal. The first energy storage unit includes: a first capacitor C1; where a first end of the first capacitor is connected with the output end of the data writing unit. The second energy storage unit includes: a second capacitor C2; where a first end of the second capacitor is connected with the high level VDD, and a second end of the second capacitor is connected with a second end of the first capacitor. The driving unit includes: a second PMOS transistor T2; where a source electrode of the second PMOS transistor is connected with the high level VDD, and a gate electrode of the second PMOS transistor is connected with the second end of the first capacitor and the second end of the second capacitor. The compensation unit includes: a fourth PMOS transistor T4; where a drain electrode of the fourth PMOS transistor is connected with the first end of the first capacitor, and a gate electrode of the fourth PMOS transistor is input with the compensation control signal. In some embodiments, the light-emitting control transistor TD is a PMOS transistor; where a source electrode of the light-emitting control transistor is connected with a drain electrode of the second PMOS transistor, and a gate electrode of the light-emitting control transistor is connected with the first end of the first capacitor. An input end of the light-emitting unit is connected with a source electrode of the fourth PMOS transistor and a drain electrode of the light-emitting control transistor.

In some embodiments, the reset unit of the pixel circuit includes a third PMOS transistor T3, a source electrode of the third PMOS transistor is connected with the drain electrode of the fourth PMOS transistor, a gate electrode of the third PMOS transistor is connected with the reset signal, and a drain electrode of the third PMOS transistor is grounded.

The present disclosure further provides a driving method for a pixel circuit, including: an initialization starting stage, turning on the driving unit and the data writing unit; an initialization ending stage, turning off the data writing unit and the driving unit; a self-discharge starting stage, turning on the self-discharge unit, after the t1 time period, turning off the compensation unit, and turning on the reset unit, and after the t2 time period, turning off the reset unit; the writing stage, turning on the data writing unit; and a light-emitting stage, turning off the data writing unit, and turning on the driving unit.

Figure 3:
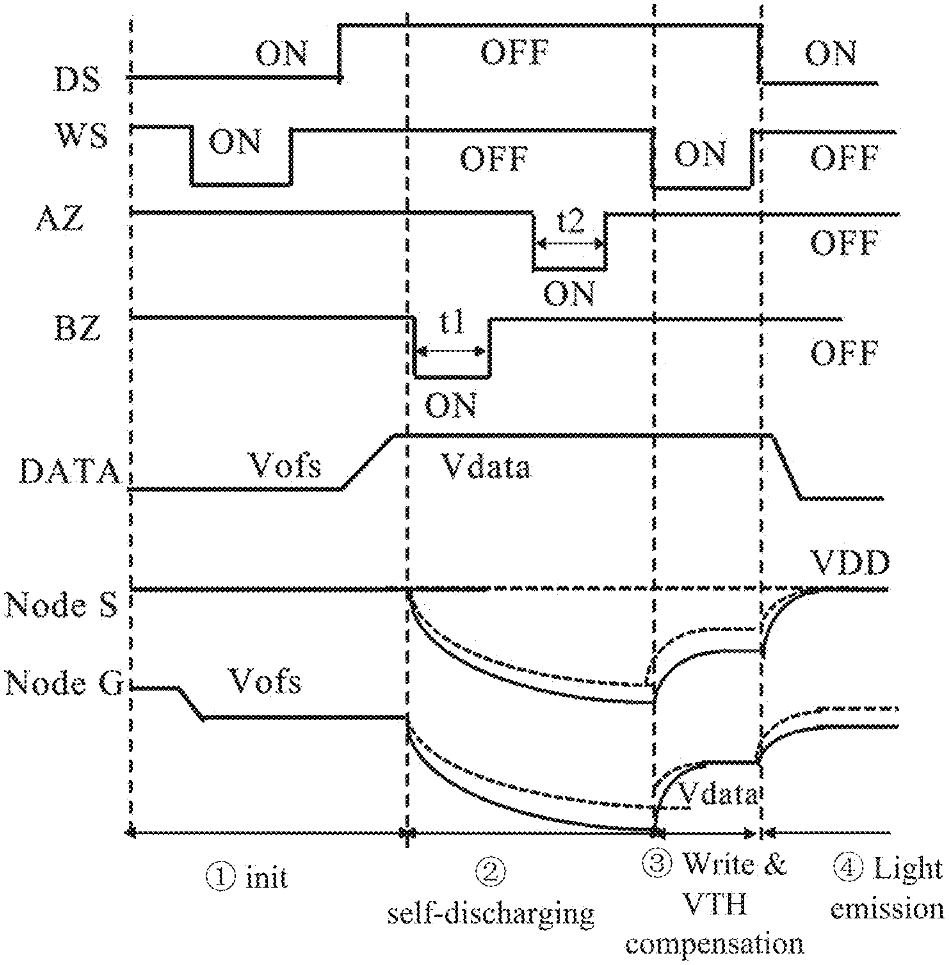
FIG. 3 is a timing diagram of a driving method of the pixel circuit shown in FIG. 2.

FIG. 3 is a timing diagram of a driving method of the pixel circuit shown in FIG. 2. The driving method of the pixel circuit shown in FIG. 2 is described below in conjunction with a specific working process.

Firstly, in the initialization (init) stage, the driving unit is turned on and the data writing unit is turned on. Specifically, referring to FIG. 3, in the initialization stage, T1/T2/T3/TD are all turned on, DATA=Vofs, and the G point is initialized; then, the initialization stage ends, the data writing unit is turned off, and the driving unit is turned off.

Then it enters the self-discharging stage, the compensation unit is turned on in the t1 time period; after the t1 time period, the compensation unit is turned off and the reset unit is turned on; and the reset unit is turned off after the t2 time period. In the actual working process, the G point is affected by the voltage drop of the S point and then coupled to the drop, and at the same time, the charge flows into the G point, causing it to rise. It is the combined effect of the two. The schematic diagram shows that the drop effect is dominant. Specifically, during the t1 time period, T4 is turned on, the voltage at point S decreases, the source voltage of the light-emitting control transistor decreases, and thereby the gate voltage of the light-emitting control transistor increases, that is, the voltage at point G increases. At the same time, due to the bias effect, the threshold voltage of the TD transistor increases until the voltage difference between the point S and the point G is equal to the threshold voltage of TD, and TD is turned off. At the same time, since only T4 is turned on in this stage, the charge flowing into the source electrode of TD is equal to the charge flowing out of the drain electrode of TD.

$$|V_{TH\_EF}| = a*(VDD - Vs) + |V_{TH}| = Vs - Vg. \quad (1)$$

$$(VDD - V_S)*C2 + [(VDD - Vofs) - (Vs - Vg)]*C1 = Vg - Vofs)* C1*C2/(C1 + C2). \quad (2)$$

Among them, $V_{TH\_EF}$ is the effective/equivalent threshold voltage of the TD transistor, $V_{TH}$ is the threshold voltage of the TD transistor, and Vofs is the initialization voltage. The voltages at point S and point G during t1 time period can be obtained by using equations (1) and (2).

$$Vs1 = \{[a - (1 + x)^2]VDD + Vofs + |V_{TH}|\} / [1 + a - (1 + x)^2]. \quad (3)$$

$$Vg1 = \{(1 + a)Vofs - (VDD - |V_{TH}|)(1 + x)^2\} / [1 + a - (1 + x)^2]. \quad (4)$$

Among them, a is the substrate bias coefficient, x=C2/C1, Vs1 is the source voltage of the light-emitting control transistor, and Vg1 is the gate voltage of the light-emitting control transistor.

In some embodiments, VDD can range from 3V to 6V, and Vofs can range from 1V to 3V.

The equation (2) for calculating the threshold voltage compensation during the self-discharge stage t1 can be expressed as follows.

$$(VDD - Vs1)*C2 + [(VDD - Vofs) - (Vs1 - Vg1)]*C1 = (Vg1 - Vofs)*C1*C2/(C1 + C2) = Q,$$

then, the voltage changes at points G and S in t1 time period, i.e., the gate voltage change and source voltage change of the light-emitting control transistor are as follows.

$$\Delta Vg1 = Vg1 - Vofs = Q*(C1 + C2)/(C1*C2). \quad (5)$$

$$\Delta Vs1 = Vs1 - VDD = Q*C1/C2*(C1 + C2).$$

$$\Delta Vs1/\Delta Vg1 = (1 - b)^2.$$

Among them, b=C2/(C1+C2), this formula is valid at any time in the time period t1. The current through TD at any time during the t1 time period is:

$$I = \beta*(Vs1 - Vg1 - |V_{TH\_EF}|)^2; \quad (6)$$

among them, β is a constant.

At the same time:

$$I = C1*C2/(C1 + C2)^{*dv9/dt}. \quad (7)$$

Combining (1), (6) and (7), the formula can be get:

$$\beta*m[Vg + p/m]^2 = b*C1*^{dv9/dt}. \quad (8)$$

Among them, $m=b^2-2b+a*(b-1)^2$, $p=(1+a)*Vinit-(1+a)*(b^2-2b)*Vofs-|V_{TH}|$, Vinit=VDD−Vofs.

Solving differential equation (8), and considering t1=0, ΔVg=Vg−Vofs=0, the formula can be get:

$$Vg1=1/\{1/[m/(p+m*Vofs)-\beta*m*t/b/C1]\}-p/m. \quad (9)$$

At this time, the voltage difference between points S and G is:

$$Vsg=Vs1-Vg1= \quad (10)$$
$$VDD+\Delta Vs1-Vofs-\Delta Vg1=VDD-Vofs+(b^2-2b)*\Delta Vg1=Vinit'.$$

Among them, ΔVg1=(9)−Vofs.

During the t2 time period, T3 is turned on to initialize the OLED anode. Specifically, the capacitors C1 and C2 are self-discharged through TD and T3. Since point G is in a floating state at this time, the voltage difference between the point S and point G remains unchanged in this stage. As the voltage at point S decreases, the threshold voltage of TD increases until a new balance is reached. The voltage difference between point S and point G during t2 time period is: Vs2−Vg2=a*(VDD−Vs3)+$|V_{TH}|$=Vinit'.

The voltages at points S and G in this stage can be obtained:

$$Vs2=VDD-(Vinit'-|V_{TH}|)/a; \quad (11)$$
$$Vg2=Vs2-Vinit'. \quad (12)$$

Then enter the writing stage, and the data writing unit is turned on. Specifically, in the data writing stage, T1 is turned on, the data voltage jumps from Vofs1 to the grayscale voltage Vdata, the G point voltage changes to Vdata, and the S point voltage changes. At this time, the G point voltage is coupled to the S point through C1;

$$\Delta Vs=(1-b)\Delta Vg; \quad (13)$$
$$\Delta Vs3=(1-b)*\Delta Vg3;$$
$$\Delta Vg3=V\text{data}-Vg3; \quad (14)$$
$$\text{at this time, } Vs3-Vg3=Vs2+(13)-V\text{data}.$$

Finally, the light-emitting stage is entered, the data writing unit is turned off, and the driving unit is turned on. Specifically, T2/TD is turned on, and the OLED starts to emit light. Since the G point is in a floating state, the voltage difference between point S and point G remains unchanged, which is the same as the writing stage. At this time, the voltage of point S becomes VDD, and the voltage of the TD transistor becomes |VTH|.

$$\text{At this time, } Vsg-|V_{TH}|=(b/a-1)*Vofs- \quad (15)$$
$$b*V\text{data}+(b/a-1)|V_{TH}|+(1-b-b/a)*(b^2-2b)*\Delta Vg1.$$
$$\text{Among them, } \Delta Vg1= \quad (16)$$
$$(13)-Vofs=1/\{1/[m/(p+m*Vofs)-\beta*m*t/b/C1]\}-p/m-Vofs.$$

Consider equation (15) in conjunction with (16). If t1=t=0, then the self-discharge phase occurs completely in the t2 time period. At this time, ΔVg1 in equation (15) is equal to 0, and the compensation effect of $|V_{TH}|$ is $$(b/a-1). \quad (17)$$

If t1=t and t is large enough, then the self-discharge phase occurs entirely in the t1 time period. At this time, the compensation effect of $|V_{TH}|$ in equation (19) is:

$$(b/a-1)+(1-b-b/a)^*(b^2-2b)/[b^2-2b+a^*(b-1)^2]= \quad (18)$$
$$b-a^*(1-b)^2/[b^2-2b+a*(b-1)^2].$$

It can be seen from equations (17) and (18) that the corresponding optimal process conditions are a=b and a=b/$(1-b)^2$, respectively. That is, the closer a is to b, the closer t1 is to 0; the closer a is to b/$(1-b)^2$, the closer t1 is to being sufficiently large.

In the actual process, when the panel is manufactured, TEG/testkey electrical testing is performed to measure the ID-VG curve under different Vs voltages, and the corresponding $|V_{TH\_EF}|$ is analyzed through the curve. Then, the substrate bias coefficient a is fitted through formula (1). Therefore, when the backplane is manufactured, a and b are completely fixed, and it is difficult to ensure that each process can meet the circuit requirement of b=a, so t1 is variable. Specifically, b is fixed, t1=t*f[b, b/$(1-b)^2$], where function f includes but is not limited to a linear function, a quadratic function and an exponential function, and can be adjusted according to the panel operation to achieve the best display effect. Therefore, when the contrast coefficient a is between b and b/$(1-b)^2$, the working time of the compensation unit can be adjusted by adjusting the length of t1 time period, thereby adjusting the degree of self-discharge to achieve the best compensation effect and thus achieve the best display effect.

Figure 4:
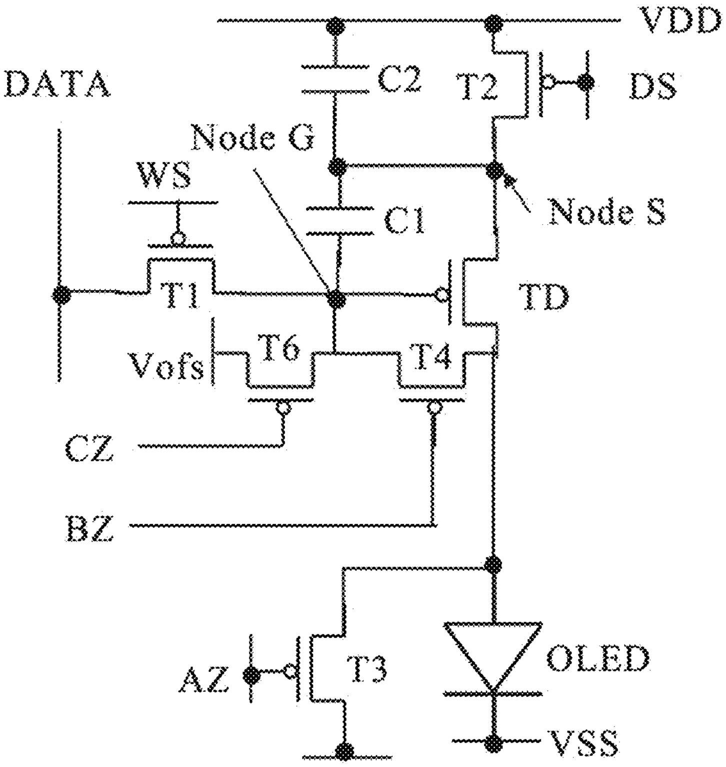
FIG. 4 is a circuit diagram of a pixel circuit according to another embodiment of the present disclosure.

In some embodiments, the pixel circuit further includes a G point initialization unit. FIG. 4 shows a circuit diagram of a pixel circuit according to another embodiment of the present disclosure, where the G point initialization unit is connected with the first end of the first energy storage unit and is used to adjust the G point voltage. Specifically, referring to FIG. 4, the G point initialization unit includes a sixth PMOS transistor (T6), a gate electrode of the sixth PMOS transistor is input with the initialization control signal, a source electrode of the sixth PMOS transistor is input with the initialization signal, and a drain electrode of the sixth PMOS transistor is connected with the first end of the first energy storage unit.

Figure 5:
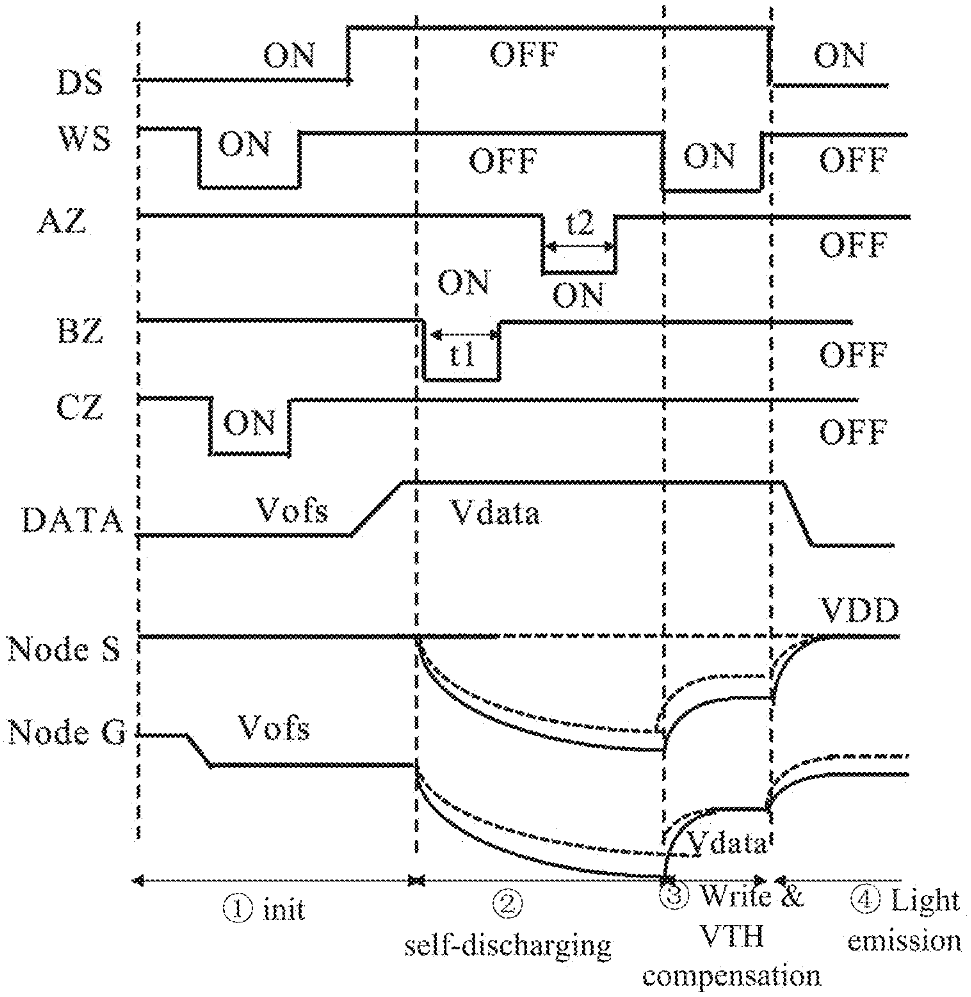
FIG. 5 is a timing diagram of the driving method of the pixel circuit shown in FIG. 4.

FIG. 5 is a timing diagram of the driving method of the pixel circuit shown in FIG. 4. Compared with the solution shown in FIG. 3, the difference in the idea of this solution is that a T6 is added to initialize the G point. In the initialization stage, the G point initialization unit is turned on. The other working processes are the same as those of the solution shown in FIG. 3 and will not be repeated here.

The above descriptions are merely embodiments of the present disclosure and are not intended to limit the scope of the present disclosure. Any equivalent structural or equivalent process transformations made using the contents of the specification and drawings of the present disclosure, such as the mutual combination of technical features between the embodiments, or direct or indirect application in other related technical fields, are also included in the protection scope of the present disclosure.

What is claimed is:

1. A pixel circuit, comprising:

a data writing unit, configured to control an input of a data signal into the pixel circuit;

a first energy storage unit, configured to store the data signal output by the data writing unit, wherein a first end of the first energy storage unit is connected with an output end of the data writing unit;

a second energy storage unit, configured to store the data signal together with the first energy storage unit, wherein a first end of the second energy storage unit is connected with a high level VDD, and a second end of the second energy storage unit is connected with a second end of the first energy storage unit;

a light-emitting unit, configured to emit light for display;

a driving unit, wherein an input end of the driving unit is connected with the high level VDD, a control end of the driving unit is input with a control signal, and an output end of the driving unit is configured to provide a light-emitting current to the light-emitting unit;

a light-emitting control transistor, configured to control conduction of the driving unit and the light-emitting unit, wherein an input end of the light-emitting control transistor is connected with the output end of the driving unit, a control end of the light-emitting control transistor is connected with the first end of the first energy storage unit, and an output end of the light-emitting control transistor is connected with the light-emitting unit; and a compensation unit, wherein an output end of the compensation unit is connected with the first end of the first energy storage unit, an input end of the compensation unit is connected with the output end of the light-emitting control transistor, and a control end of the compensation unit is input with a compensation control signal.

2. The pixel circuit according to claim 1, further comprising: a reset unit configured to reset the light-emitting unit; wherein the reset unit is connected with an input end of the light-emitting unit.

3. The pixel circuit according to claim 2, wherein the reset unit comprises: a third PMOS transistor;

wherein a source electrode of the third PMOS transistor is connected with the output end of the compensation unit, a gate electrode of the third PMOS transistor is input with a reset signal, and a drain electrode of the third PMOS transistor is grounded.

4. The pixel circuit according to claim 1, wherein the data writing unit comprises: a first Positive channel Metal Oxide Semiconductor (PMOS) transistor;

wherein a source electrode of the PMOS transistor is input with the data signal.

5. The pixel circuit according to claim 1, wherein the first energy storage unit comprises: a first capacitor;

wherein a first end of the first capacitor is connected with the output end of the data writing unit.

6. The pixel circuit according to claim 5, wherein the second energy storage unit comprises:

a second capacitor;

wherein a first end of the second capacitor is connected with the high level VDD, and a second end of the second capacitor is connected with a second end of the first capacitor.

7. The pixel circuit according to claim 6, wherein the driving unit comprises: a second PMOS transistor;

wherein a source electrode of the second PMOS transistor is connected with the high level VDD, and a gate electrode of the second PMOS transistor is connected with the second end of the first capacitor and the second end of the second capacitor.

8. The pixel circuit according to claim 7, wherein the compensation unit comprises: a fourth PMOS transistor;

wherein a drain electrode of the fourth PMOS transistor is connected with the first end of the first capacitor, and a gate electrode of the fourth PMOS transistor is input with the compensation control signal.

9. The pixel circuit according to claim 8, wherein the light-emitting control transistor is a PMOS transistor;

wherein a source electrode of the light-emitting control transistor is connected with a drain electrode of the second PMOS transistor, and a gate electrode of the light-emitting control transistor is connected with the first end of the first capacitor.

10. The pixel circuit according to claim 9, wherein an input end of the light-emitting unit is connected with a source electrode of the fourth PMOS transistor and a drain electrode of the light-emitting control transistor.

11. The pixel circuit according to claim 1, further comprising: a G point initialization unit, configured to adjust a voltage of a G point;

wherein the G point initialization unit is connected with the first end of the first energy storage unit.

12. The pixel circuit according to claim 11, wherein the G point initialization unit comprises: a sixth PMOS transistor;

wherein a gate electrode of the sixth PMOS transistor is input with an initialization control signal, a source electrode of the sixth PMOS transistor is input with an initialization signal, and a drain electrode of the sixth PMOS transistor is connected with the first end of the first energy storage unit.

13. A method for driving the pixel circuit according to claim 1, comprising in sequence: an initialization stage; a self-discharge stage; a writing stage; and a light-emitting stage;

wherein at the self-discharge stage, a working time of the compensation unit is adjusted to complete an adjustment of a threshold voltage of the light-emitting control transistor.

14. The method for driving the pixel circuit according to claim 13, comprising:

starting the initialization stage: turning on the driving unit and the data writing unit;

ending the initialization stage: turning off the data writing unit and the driving unit;

starting the self-discharge stage: turning on the compensation unit, turning off the compensation unit and turning on a reset unit after t1 time period, and turning off the reset unit after t2 time period, wherein the self-discharge stage lasts for t time period, and t=t1+t2;

at the writing stage, turning on the data writing unit;

at the light-emitting stage, turning off the data writing unit, and turning on the driving unit.

15. The method for driving the pixel circuit according to claim 14, wherein:

$$\text{when } a = b\text{, then } t1 = 0,\ t2 = t;$$

$$\text{when } a = b/(1-b)^2\text{, then } t1 = t,\ t2 = 0;$$

wherein $b=C2/(C1+C2)$, a is an substrate bias coefficient, C1 is a first capacitance value, and C2 is a second capacitance value.

16. The method for driving the pixel circuit according to claim 15, wherein at the initialization stage, the first PMOS transistor, the second PMOS transistor, and the light-emitting control transistor are all turned on, the data signal is Vofs, and the G point is initialized.

17. The method for driving the pixel circuit according to claim 16, wherein:

when a is between b and $b/(1-b)^2$, then $t1=t*f[b, b/(1-b)^2]$;

wherein the function f is adjusted according to an operation of a panel; and the function f is a linear function, a quadratic function or an exponential function.

18. The method for driving the pixel circuit according to claim 17, wherein during the t1 time period:

the fourth PMOS transistor is turned on, a source voltage of the light-emitting control transistor is reduced, a gate voltage of the light-emitting control transistor is increased;

due to a substrate bias effect, the threshold voltage of the light-emitting control transistor is increased until a difference between the source voltage and gate voltage is equal to the threshold voltage of the light-emitting control transistor, and the light-emitting control transistor is turned off.

19. The method for driving the pixel circuit according to claim 17, wherein, during the t1 time period:

$$|V_{TH\_EF}| = a*(VDD - Vs) + |V_{TH}| = Vs - Vg;$$

$$(VDD - V_s)*C2 + [(VDD - Vofs) - (Vs - Vg)]*C1 = (Vg - Vofs)*C1*C2/(C1 + C2);$$

wherein, $V_{TH\_EF}$ is an equivalent threshold voltage of the light-emitting control transistor, $V_{TH}$ is the threshold voltage of the light-emitting control transistor, and Vofs is an initialization voltage;

$$Vs1 = \{[a - (1 + x)^2]VDD + Vofs + |V_{TH}|\}/[1 + a - (1 + x)^2];$$

$$Vg1 = \{(1 + a)Vofs - (VDD - |V_{TH}|)(1 + x)^2\}/[1 + a - (1 + x)^2];$$

wherein a is an substrate bias coefficient, $x=C2/C1$, Vs1 is a source voltage of the light-emitting control transistor, Vg1 is a gate voltage of the light-emitting control transistor.

20. The method for driving the pixel circuit according to claim 19, wherein, during the t1 time period, a threshold voltage compensation of the light-emitting control transistor is calculated as follows:

$$(VDD - Vs1)*C2 + [(VDD - Vofs) - (Vs1 - Vg1)]*C1 = (Vg1 - Vofs)*C1*C2/(C1 + C2) = Q;$$

wherein Q is the threshold voltage compensation of the light-emitting control transistor, during the t1 time period, ΔVs1 is a change amount of the source voltage of the light-emitting control transistor, and ΔVg1 is a change amount of the gate voltage of the light-emitting control transistor:

$$\Delta Vg1 = Vg1 - Vofs = Q*(C1 + C2)/(C1^*C2);$$

$$\Delta Vs1 = Vs1 - VDD = Q*C1/C2*(C1 + C2);$$

$$\Delta Vs1/\Delta Vg1 = (1 - b)^2;$$

wherein a current through the light-emitting control transistor is calculated as follows:

$I=\beta*(Vs1-Vg1-|V_{TH\_EF}|)^2$; wherein, β is a constant.

* * * * *